United States Patent [19]

Cummisford et al.

[11] 4,098,859
[45] Jul. 4, 1978

[54] METHOD OF MANUFACTURING A BONDED PARTICULATE ARTICLE BY REACTING A POLYOL AND A POLYALDEHYDE

[75] Inventors: Robert G. Cummisford, Brookfield; Richard J. Wasielewski, Milwaukee; Robert K. Krueger, Sheboygan, all of Wis.

[73] Assignee: Krause Milling Company, Milwaukee, Wis.

[21] Appl. No.: 741,252

[22] Filed: Nov. 12, 1976

Related U.S. Application Data

[62] Division of Ser. No. 551,882, Feb. 21, 1975, Pat. No. 4,013,629.

[51] Int. Cl.$^2$ .............................................. B01D 47/02
[52] U.S. Cl. .................................. 264/122; 106/137; 106/138; 106/163 R; 106/193 R; 106/209; 106/214; 260/112 R; 260/123.7; 264/109; 264/125; 536/1; 536/2; 536/3; 536/84; 536/103; 536/104; 536/106; 536/114

[58] Field of Search ................... 536/1, 2, 3, 84, 103, 536/104, 106, 114; 264/109, 122, 125; 260/112 R, 123.7; 106/137, 138, 163 R, 193 R, 209, 214

[56] References Cited

U.S. PATENT DOCUMENTS

| | | | |
|---|---|---|---|
| 3,357,846 | 12/1967 | Growald | 106/214 |
| 4,013,629 | 3/1977 | Cummisford et al. | 260/123.7 |

*Primary Examiner*—Melvyn I. Marquis
*Attorney, Agent, or Firm*—Wheeler, Morsell, House & Fuller

[57] ABSTRACT

Disclosed herein is a method of manufacturing a bonded particulate article by admixing particulate material with a binder system, the binder system being formed by admixing a polyol selected from the group comprising a saccharide, a saccharide polymer, and a glyco protein with glyoxal, with a solvent, and with an alkali halide; forming the admixture in a heated mold; removing the bonded article from the mold; and allowing it to cool.

15 Claims, 7 Drawing Figures

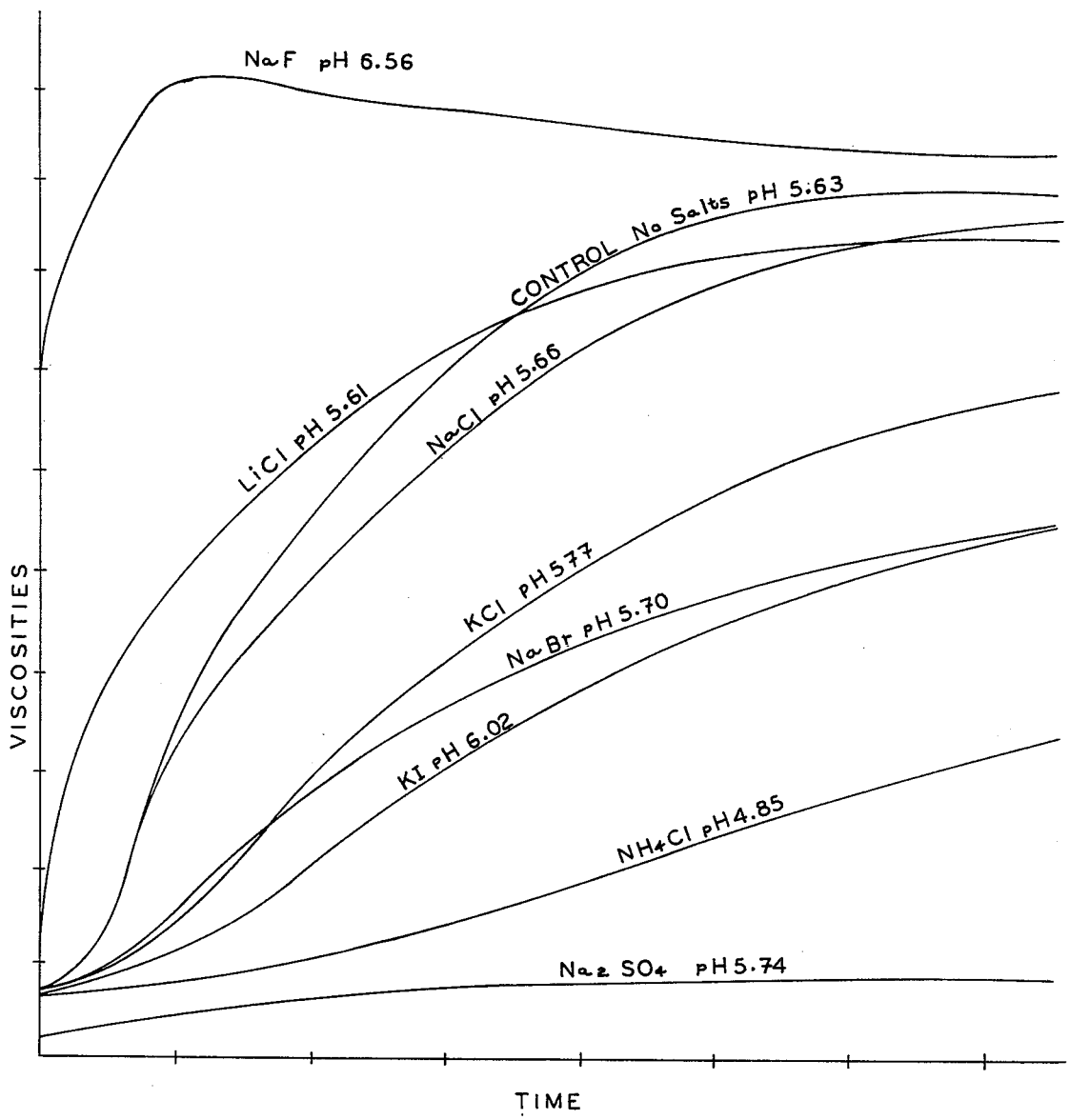

METHOD OF MANUFACTURING A BONDED PARTICULATE ARTICLE BY REACTING A POLYOL AND A POLYALDEHYDE

This application is a division of Ser. No. 551,882, filed Feb. 21, 1975 now U.S. Pat. No. 4,013,629.

BACKGROUND OF THE INVENTION

This invention relates to a binder system employing polyhydroxyl compounds, glyoxal and catalyst in aqueous medium. More particularly, this invention relates to use of a catalyst which controls the reaction between polyhydroxyl compounds and glyoxal allowing new uses with heretofore unattainable versatility. Particularly the invention relates to the use of polyhydroxyl compounds comprising the saccharides and polymers made up essentially of repeating saccharide units, the amylaceous materials and hydrolysis products thereof exemplifying this latter group. This binder system has shown good utility as a foundry core binder.

The crosslinking of polyhydroxyl compounds, particularly polysaccharides like starch, with multifunctional reagents reactive with hydroxyl groups is well known and widely used. Common reagents used to crosslink starch (amylaceous materials) are formaldehyde, glyoxal, polyisocyanates, polyaldehyde resins, phenolic resins, urea formaldehyde resins and inorganic reagents including borates, phosphates, stannates and antimonates. All of these reagents have been used to crosslink cereal derived products for specific uses. When using glyoxal, the reaction proceeds so rapidly that utility of the binder system is greatly reduced. Some applications, such as foundry sand core manufacture, are difficult since the reaction takes place before the sand-binder mix can be formed into cores. This rapid reaction means that very short mixing and forming times must be employed. For making cores using the more conventional equipment such as hot box or baking type cores, a longer working life of the sand mix is required but yet the mixture must set and react rapidly with the application of heat.

Applicants are aware of no prior art pertaining to the control of the reaction rate of polyols and polyaldehydes in an aqueous medium using alkali halides. Reference has been found to the use of base acids and organic acids. U.S. Pat. Nos. 2,867,615 to Lehmann and Gandon and 2,999,032 to Dekker show reactions between glyoxal and starch in water in the presence of acids. Rumberger U.S. Pat. No. 3,293,057 discloses the reaction of starch, urea and a poly functional aldehyde. In order to maintain acid conditions, acids or acid salts are utilized. Nickerson and Weymouth U.S. Pat. No. 3,700,611 discloses the use of glyoxal, polyvinyl alcohol and cis 1,2 polyols or 1,3 polyols. No catalyst is used or mentioned. Williams and Cosica U.S. Pat. No. 3,597,313 relates to cyanamide modification of polyvinyl alcohol and subsequent crosslinking with glyoxal. These products are cationic. Other patents disclosing aldehydes or other crosslinking materials used with specific starch derivatives, mainly cationic starches, include:

U.S. Pat. Nos. 3,051,691; 3,127,393; 3,135,738; 3,238,193; 3,275,576; 3,277,025.
None of these relate to catalysis.

No prior art for a foundry binder has been located which is based on starch and polyaldehyde or on polyol and polyaldehyde. Patents disclosing starch products, some for use as foundry binders, include U.S. Pat. Nos. 2,894,859 to Wimmer and Meindl; 2,159,505 to Brugess and Johnson; 3,251,702 to Stickley et al; and 3,565,651 to Waggle. None of these patents are pertinent to the novel features of the present invention.

Foundry binders currently used in hot box and baked core making operations are thermosetting resins like phenolics, furans, urea formaldehyde and mixtures of these and oxidizable oils commonly called core oils in the industry. These binders have the disadvantage of emitting odorous fumes during the application of heat, and if the cores are to be baked, green strength additives must be used so that the cores have sufficient strength to be put into and through an oven.

The use of the catalyzed glyoxal saccharide system is applicable to foundry sand cores, cellulose press formed products, adhesives, coating binders and in many other areas. This wide utility is possible in part to the great variation in working and final properties available by controlling the amounts of reactants and catalyst and by selecting the saccharide from the wide range of materials available. A particular group of materials derived from cereal grains has been found to be uniquely beneficial in the foundry core making operation. This group is characterized by being gelatinized and of low molecular weight in comparison to native cereal or heretofore available cereal foundry binder products. An unexpectedly beneficial process to make these products is described, said process consisting of the key steps of depolymerization followed by gelatinization.

SUMMARY OF THE INVENTION

This invention relates to a general binder system employing glyoxal, a polyhydroxyl compound and a unique catalyst comprised of inorganic alkali halides. More particularly, the polyols are those which react rapidly with the glyoxal and are exemplified by saccharides including sugars, starch, starch hydrolysates, gums, dextrins, so long as these are water hydratable or soluble and have available reactive groups, polyvinyl alcohol and proteins, again with the restriction that these are reactive with dialdehydes and are water hydratable or soluble, such as a collagen protein and the like.

It is a general object of this invention to make it possible for glyoxal to be used to give a low-cost, resin-forming binder system with control over the rate of setting.

DESCRIPTION OF THE DRAWINGS

In the accompanying drawings:

FIG. 7 shows viscosity curves from the glyoxal-flour reactions in the presence of a number of different salts.

GENERAL DESCRIPTION

We have discovered that the use of alkali halides in conjunction with aqueous dispersions of the above polyols and glyoxal gives a degree of control over the reaction which has heretofore been unattainable. This allows an entirely new spectrum of binder applications for these polyols with large variations in the properties of the binder system. By changing the molecular size of the polyol, adjusting the glyoxal concentration and selecting an alkali halide and its concentration, it should be apparent to those skilled in the art that a great variety of binder system properties can be obtained.

This variation of binder properties is possible for both the cured and uncured states. The alkaline halides show a definite order of retardation of the reaction both regarding cation and anion. For the cations, this order is potassium > sodium > lithium, and for the anions I > Br > Cl > F in order of decreasing retardation. Thus, KCl retards the reaction to a greater extent than NaCl at equal molar concentrations.

Figure 1:
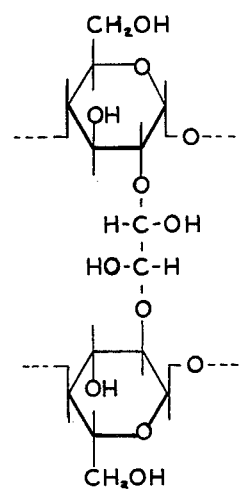
FIG. 1 shows a hemi-acetal formation in the first step of the reaction between the glyoxal and the polyhydroxyl compound.

The reaction between glyoxal and polyols has been described variously. The general accepted precepts are that the reaction may result in hemi-acetal or acetal structures. At pH above 7 hemi-acetal formation has been reported, while below 7 the acetal may be formed. When using the salt catalysts, the pH effects are also operative. Evidence suggests that the reaction also proceeds in two distinct steps. The first step is thought to be a hemi-acetal formation, as shown in FIG. 1, and the second step acetal formation. It is understood that this invention is not dependent on the accuracy of the above postulated compound formations.

The visible effects of a reaction, in an aqueous dispersion of water hydratable polyol containing salt and glyoxal, are an initial thickening which appears to follow a first order reaction rate and a final product which is an almost dry non-fluid mass. This latter reaction is difficult to monitor with simple techniques such as viscosity measurements since an apparent multi-phase system which at high solids resembles damp wood flour and at low solids a slurry is formed. Without salt, this reaction proceeds very rapidly, causing a fast viscosity rise and quickly resulting in a hard-to-handle multiphasic looking system. By the use of salts, these changes can be dramatically slowed or accelerated, depending on the choice of salt.

Thus, NaI, NaBr, KBr, KCl, NaCl slow the reaction while NaF and LiCl accelerate the reaction. Increased concentrations of the salts increase the effects.

The importance of the present invention should be apparent. It is now possible for glyoxal and polyols to be used as low cost resin forming binder systems with control over the rate of thermosetting. Practical examples of this are the formation of foundry cores and the formation of molded wood fiber articles. In both of these examples the binder system is mixed with filler which comprises the major portion of the article. The mixture is then formed and cured to harden the resinous binder, giving the shaped article integrity and durability. The most common method of cure is the application of heat, which means that the binder system must be heat activated to cure rapidly prior to solvent loss.

If the binder system did not heat cure, dehydration would occur upon the application of heat, and the resulting mass would be non-bonded or bound only by a hardening associated with solvent loss. This type of binding is shown by the more familiar plain amylaceous binders (no crosslinking). The system of this invention exhibits a definite working time span after which time a compaction of the binder containing filler mass would not give integrally bonded composite structures, even though the initial amount of solvent (water) is still present in the mix. Further, the strength and integrity of the formed article is substantially greater when the binder system of this invention is used and cured during the working time span than is the strength and integrity of similar articles formed with amylaceous binders alone or with the binders of this invention where the working time span has elapsed prior to article formation.

In the production of foundry cores, there are a number of different methods for applying heat to the formed cores to bring about a cure of the binder. These include cold forming followed by baking of the cores, forming the cores in heated patterns, sometimes called a hot box, and forming the cores in a pattern or box followed by forcing heated air through the core.

The system of this invention can be used in any of the above methods. The advantages of this system are the use of aqueous solvents which emit no odors or noxious fumes and that the binder system presents no air or water pollution hazards.

We have further found that a particular group of cereal derived polysaccharides are uniquely useful as binders in the above-mentioned systems. These cereal based products are characterized by being hydratable in cold water and being reduced in molecular weight. We have also discovered a unique process to manufacture these cereal binders comprised of the two separate and distinct steps of chemical hydrolysis followed by a heat treatment.

DESCRIPTION OF THE PREFERRED EMBODIMENTS

The crosslinking of a polyol by glyoxal while controlling the rate by means of alkali halides can be demonstrated in a binder system alone, in the production of a formed article from a particulate material such as the manufacture of foundry cores or in the molding of wood fiber articles. As previously stated, the reaction between glyoxal and polyols such as amylaceous materials apparently proceeds in two steps. The first step is postulated as the formation of a hemi-acetal and the later step as the formation of acetal linkages.

In an aqueous dispersion of glyoxal and hydrolyzed pregelatinized amylaceous material, a rapid thickening occurs, resulting in a gel-like structure and finally proceeding to a damp paste which may actually precipitate if the solids are at a low level. The inclusion of alkali halide alters the rate of these visible changes in the system. The easiest change to follow is the initial thickening. This can be accomplished by mixing all materials and recording the changes in viscosity with time. By using a controlled rate of heating, the initial reaction can be shown to be heat activated. By varying pH, the initial reaction can be shown to be accelerated by rising pH.

The second step in the reaction is more difficult to characterize, but clear evidence can be obtained by using sand mixes and forming foundry cores. In this case, the initial reaction step gives an increase in green strength of the sand mix, and the second step gives a non-cohesive mix with no green strength and no thermosetting properties.

Prior to the discovery of the rate influence exerted by alkali halides, the use of glyoxal and amylaceous binders was limited to those areas where a fast reaction was desired and/or glyoxal and amylaceous material could be mixed with no shaping or formation after mixing. Thus a starch bonded clay coating could be applied to paper stock and then crosslinked by applying glyoxal. However, for the use of glyoxal and amylaceous material in a foundry core sand, the mix had a reaction so rapid that very short working times were available. If core making and mixing were a continuous integrated process of a short duration such as three minutes or less from start to finish, the production of useful cores might be possible. However, most present core making operations utilize batch processes for mixing the sand and binders. After mixing, the batch is transferred to a core making area and used to make cores. This operation may require sixty minutes for one batch of sand to be mixed and formed into cores. Thus, without some means for controlling the reaction between glyoxal and the amylaceous material, the manufacture of foundry cores is not feasible using an amylaceous-glyoxal binder. The same limitations apply to other binder uses such as for molded articles employing cellulose fillers or for laminated articles.

Example 1 which follows demonstrates the difference between foundry test cores with and without crosslinking agent and catalyst. The binder used in this example was an acid modified corn flour which was then extruded. This binder was produced from acid modified corn flour with cold water solubles (CWS) of 12.8% of an alkaline viscosity of 20.3 seconds (1.3 g sample). After extrusion the binder had CWS of 84.3% and an alkaline viscosity of 13.6 seconds (1.3 g sample).

The sand mixes were made in a laboratory Hobart mixer using one minute at low speed to dry blend the sand and the cereal binder and four minutes at high speed to blend the liquid ingredients which were salt dissolved in water and 40% glyoxal solution. In the table the binder amounts are given as percent of sand, which is common practice in the foundry industry.

EXAMPLE 1

| Mix | % Cereal | % Glyoxal 40% Solution | % NaCl | % H$_2$O | Tensile Strength psi |
|---|---|---|---|---|---|
| 254 | 2.0 | 0.0 | 0.0 | 3.0 | 55.6 |
| 255 | 2.0 | 0.6 | 0.0 | 3.0 | 138.1 |
| 253 | 2.0 | 0.6 | 0.5 | 2.8 | 239.2 |
| 276 | 2.0 | 0.0 | 0.5 | 2.8 | 105.0 |

The test cores were blown into a hot box at 400° F and held in the box for 45 seconds. This box produced one dog bone specimen 1 inch thick such as commonly used for tensile testing by foundries. Tensile strengths represent the average of three specimens tested 4½ hours after blowing.

An attempt to make a larger test batch of the mix No. 255 formulation in a Simpson mix muller gave specimens which fell apart upon removal from the hot box. Nor could cores be made from the mix No. 255 formulation after holding for a period of time after mixing.

EXAMPLE 2

Example 2 demonstrates the use of a Simpson mix muller employing a 2 min. dry and 4 min. wet mixing period.

| % Cereal | % Glyoxal 40% Solution | % NaCl | % H$_2$O | Tensile Strength psi |
|---|---|---|---|---|
| 2.0 | 0.6 | 0 | 3.0 | — |
| 2.0 | 0.6 | 0.5 | 2.8 | 273.6 |

The above test cores were blown in a single cavity dog bone hot box at 400° F with 45 seconds retention time in the box.

Example 3 shows the performance of the salt catalyzed binder system with time for sand mixes on the laboratory Hobart mixer employing 1 minute low speed dry and 4 minutes high speed wet mixing. Without salt, cores could not be made after holding the sand mix ½ hour.

EXAMPLE 3

| % Binder | % Glyoxal | % Salt | % Water | Hours Holding Time | Tensile psi |
|---|---|---|---|---|---|
| 2 | 0.6 | 0.5 | 2.8 | 0.5 | 243.1 |
| 2 | 0.6 | 0.5 | 2.8 | 1.0 | 214.2 |
| 2 | 0.6 | 0.5 | 2.8 | 1.5 | 184.4 |

In the first three examples American Foundry Society Testing Sand was used for all mixes. This is a grain controlled silica sand used only for test purposes. Example 4 shows the favorable results of using a common foundry core sand, Portage 520, from Martin Marietta Aggregates.

EXAMPLE 4

| % Binder | % Glyoxal | % Salt | % Water | Sand | Tensile psi |
|---|---|---|---|---|---|
| 2 | 0.6 | 0.5 | 2.8 | AFS | 215.0 |
| 2 | 0.6 | 0.5 | 2.8 | Portage | 265.8 |

Cores were blown in a single cavity dog bone hot box at 400° F with a 45 second residence time.

In foundries it is often useful to know the effects of shorter or longer dwell times in the hot box on the strength of the cores. Example 5 illustrates the difference obtained by different dwell times. All mixes were prepared in a Hobart and blown in the single cavity hot box at 400° F.

EXAMPLE 5

| % Binder | % Glyoxal | % Salt | % Water | Dwell | Tensile psi |
|---|---|---|---|---|---|
| 2 | 0.4 | 0.5 | 2.8 | 30 sec. | 147.5 |
| 2 | 0.4 | 0.5 | 2.8 | 45 sec. | 245.6 |
| 2 | 0.4 | 0.5 | 2.8 | 60 sec. | 243.3 |

This example clearly demonstrates the heat activated cure and the binder system tolerance for curing that extends through a workable range.

Example 6 demonstrates that variations in the amount of binder, glyoxal, water and salt can be tolerated and used to control the finished product properties with the same binder and sand. For this example, AFS sand and the binder from Example 1 were used.

EXAMPLE 6

| % Binder | % Glyoxal | % NaCl | % H₂O | Tensile psi |
|---|---|---|---|---|
| 2 | 0.4 | 0.3 | 3.0 | 203.1 |
| 2 | 0.6 | 0.5 | 2.8 | 226.2 |
| 2 | 0.0 | 0.0 | 3.0 | 55.6 |
| 2 | 0.6 | 0.0 | 3.0 | 138.1 |
| 1.5 | 0.6 | 0.5 | 2.8 | 223.8 |
| 1.5 | 0.4 | 0.5 | 2.8 | 216.9 |
| 2 | 0.4 | 0.5 | 2.8 | 245.6 |
| 2 | 0.0 | 0.5 | 2.8 | 106.8 |
| 3 | 0.4 | 0.3 | 3.0 | 259.3 |
| 3 | 0.8 | 0.3 | 3.0 | 252.5 |
| 2 | 0.6 | 0.7 | 3.0 | 237.8 |
| 2 | 0.6 | 0.7 | 2.5 | 243.1 |

A regression analysis on the above data resulted in the form

Tensile = $A$.% Binder + $B$.% Glyoxal + $C$.% NaCl + $D$.% H₂O + $E$ gave $A = 38.8$, $B = 146.3$, $C = 157.3$, $D = 23$ and $E = -75.2$.

This gives a crude expression for approximating the final strength of a test specimen with AFS sand and a 45 second cure at 400° F. The importance of glyoxal, salt, binder and water concentrations are also shown. Because of the form of the regression analysis, the limited data base and the great number of variables not considered, this relationship of binder system components to tensile strength should not be considered definitive. It does emphasize that each of the variables studied is necessary for adequate function of the binder system.

Example 7 shows the effect of different salts at equimolar concentration. In each case 12.75 gms H₂O were used per 500 gms of sand. All mixes were made in a laboratory Hobart, 1 min. low speed dry blend and 4 min. 2nd speed wet mix. Cores were blown into a single cavity dog bone core box at 425° F and cured for 45 seconds in the box. All mixes had 2% binder by weight of sand and 0.4% glyoxal 40% solution.

EXAMPLE 7

| Salt | Gms | Tensile psi |
|---|---|---|
| NaCl | 2.25 gms | 215.0 |
| LiCl | 1.60 gms | 48.8 |
| KCl | 2.88 gms | 258.1 |
| KI | 6.44 gms | 175.0 |
| NaBr | 3.97 gms | 85.6 |
| KF · 2H₂O | 3.68 gms | 31.3 |

EXAMPLE 8

In this example salts other than alkali halides are compared to alkali halides all at equal % by weight based on sand. 2% binder and 0.6% glyoxal were used.

| Salt | % | Tensile psi |
|---|---|---|
| NaBr | 0.3 | 182.5 |
| NaOH | 0.3 | 57.5 |
| Na₂SO₄ | 0.3 | 150.0 |
| Na₂SO₃ | 0.3 | 82.5 |
| NH₄Cl | 0.3 | Too low to measure |
| Na₃PO₄ | | 122 H₃PO₄ adjusted pH to 5.9 |

The foregoing examples have demonstrated the catalytic effect of the salts on the reaction between glyoxal and a hydrolyzed gelatinized cereal product. However, this effect can be demonstrated in another manner that more clearly shows the catalytic action by studying the postulated first step in the reaction sequence. The following discussion and examples will show the effects of temperature, molar ratios of reagents, pH, physical form of the glyoxal and salt types and concentrations.

We have found that aqueous dispersions of cereal flours, starches, proteins and the like increase in viscosity upon reaction with glyoxal and that this viscosity increase is a direct indication of the extent of the cross-linking reaction. A recording Brabender Visco/amylo/-Graph (C. W. Brabender Instruments, Inc., South Hackensack, N.J.) was found to be ideally suited for measuring these viscosity increases under controlled temperature conditions.

The effect of temperature on the rate of reaction between glyoxal and an acid modified cereal flour is demonstrated by the following example.

EXAMPLE 9

Figure 2:
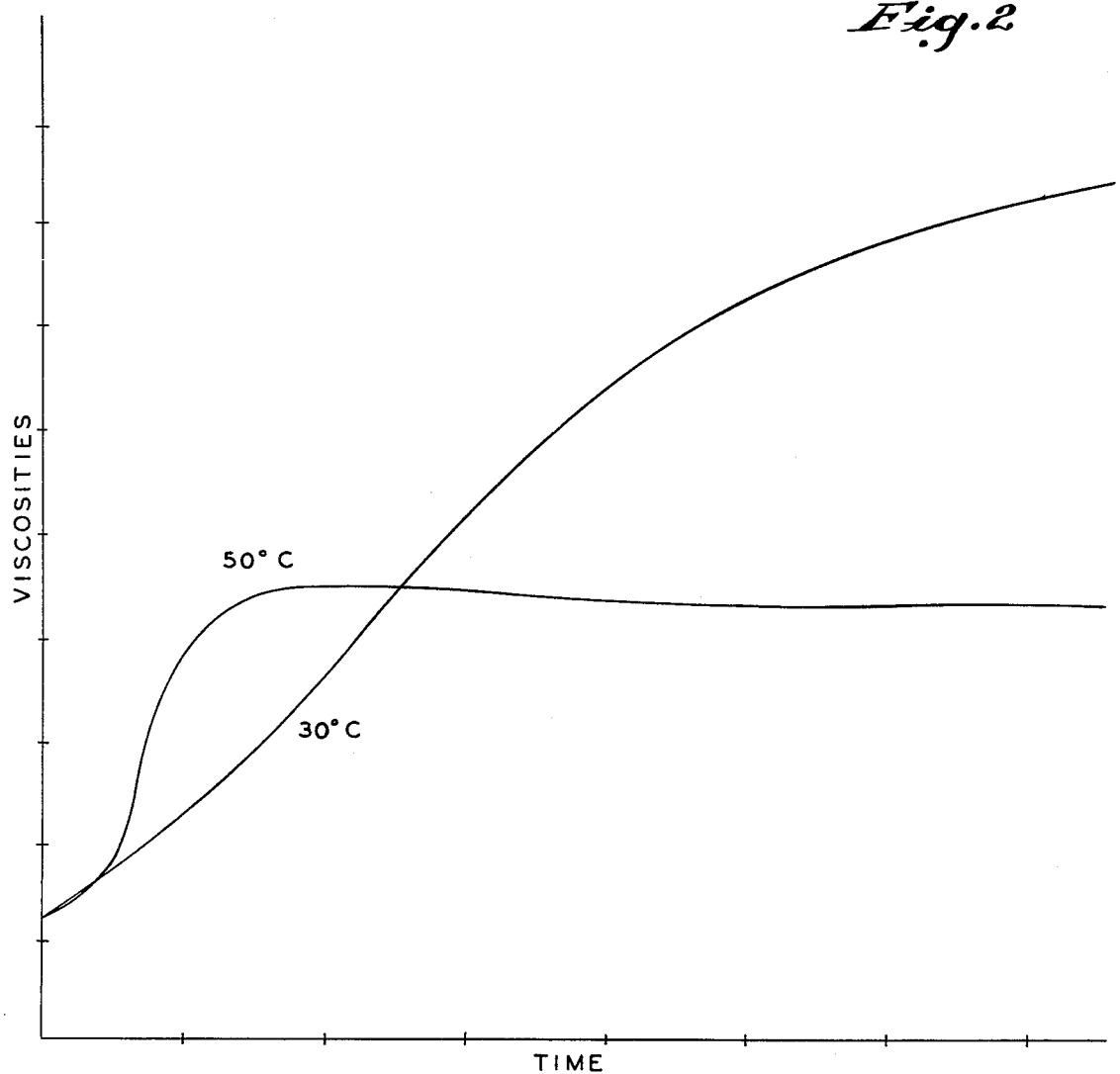
FIG. 2 shows viscosity curves which demonstrate that the rate of the glyoxal-cereal reaction is accelerated by increasing temperature.

One hundred fifty parts by weight of acid modified cereal flour was dispersed in 333 parts by volume of water in a Waring blendor for 2 minutes. With continued mixing for 1 minute, 16.8 parts by volume of aqueous 40% glyoxal was added. The pH of this slurry was adjusted to 5.8 with a few drops of 20% sodium hydroxide solution. The dispersion was transferred to the Brabender apparatus, and the reaction was allowed to proceed at 30° C. This procedure was exactly repeated except the reaction was conducted at 50° C. FIG. 2 shows the viscosity curves for these two reactions.

The viscosity curves shown in FIG. 2 demonstrate that the rate of glyoxal-cereal reaction is significantly accelerated by increasing temperature. Further, the viscosity curve at 30° C shows that the rate of reaction at near ambient temperatures is of such a magnitude that the useful life of a glyoxal-cereal binder system is quite limited in the absence of other controlling factors.

The following example will demonstrate the effect of varying the concentration of glyoxal available for reaction with a constant amount of an acid modified flour at constant conditions of pH and temperature.

EXAMPLE 10

Figure 3:
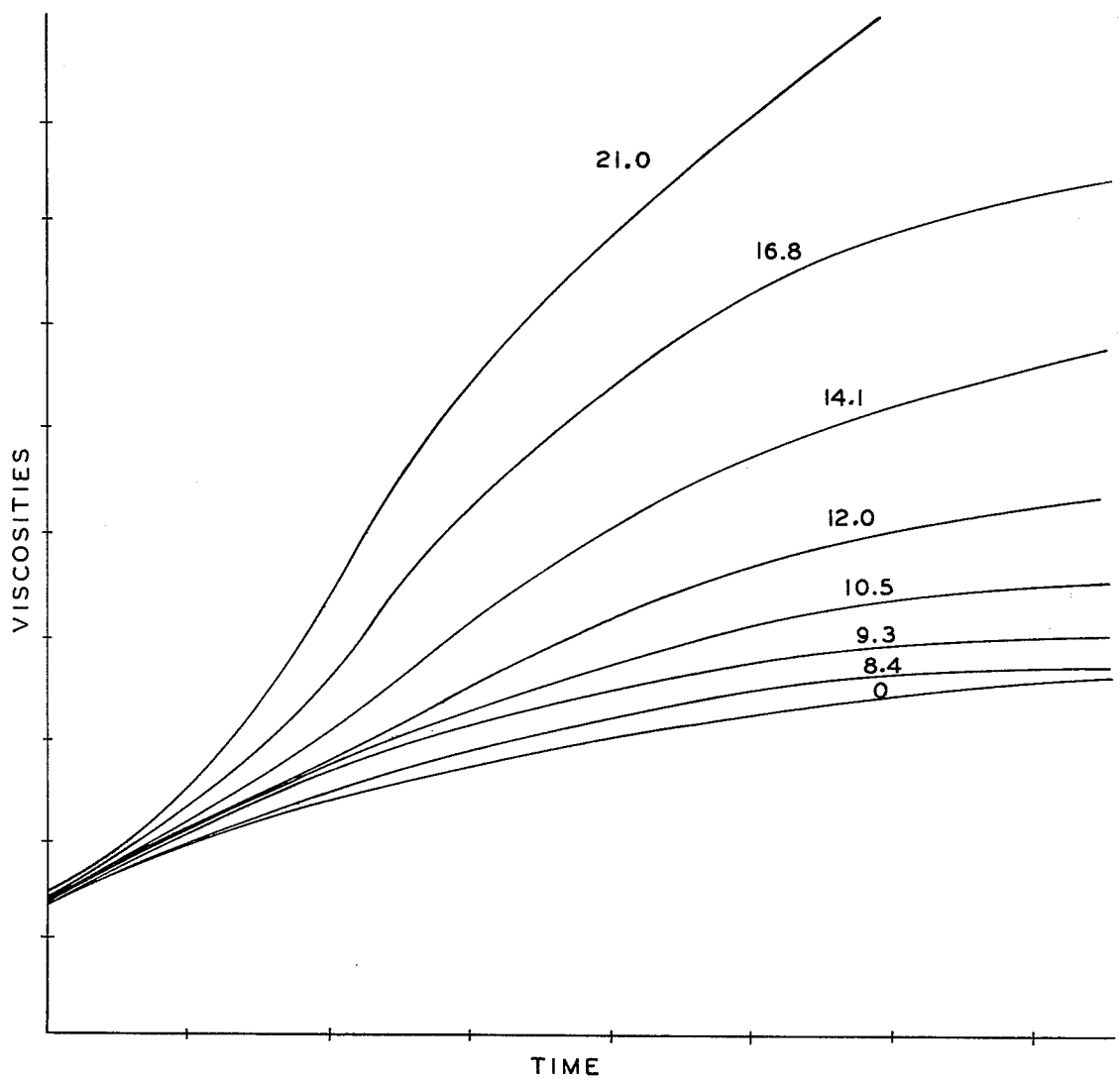
FIG. 3 illustrates the family of viscosity curves showing that the rate of viscosity increase is dependent upon glyoxal concentration.

Samples of 150 parts by weight of acid modified pregelled cereal flour were dispersed in the appropriate volumes of water based upon the levels of aqueous 40% glyoxal to be added to yield constant concentrations of 30% flour solids. These dispersions were mixed for 2 minutes in a Waring blendor. With continued mixing for 1 minute, the varying levels of 0, 8.4, 9.3, 10.5, 12.0, 14.1, 16.8 and 21.0 parts by volume of aqueous 40% glyoxal were added. The pH of each mixture was adjusted to 5.8 with 20% sodium hydroxide solution. The dispersions were allowed to react at 30° C in the Brabender apparatus. FIG. 3 shows the family of viscosity curves which resulted from these reaction dispersions.

These curves show that the rate of viscosity increase is dependent upon glyoxal concentration which affords one means for control of this reaction. However, in many end-use applications of the glyoxal-binder system, this method of control is not practical.

The viscosity curves of the following example will demonstrate the effect of pH on the rate of reaction between glyoxal and a cereal flour.

EXAMPLE 11

Figure 4:
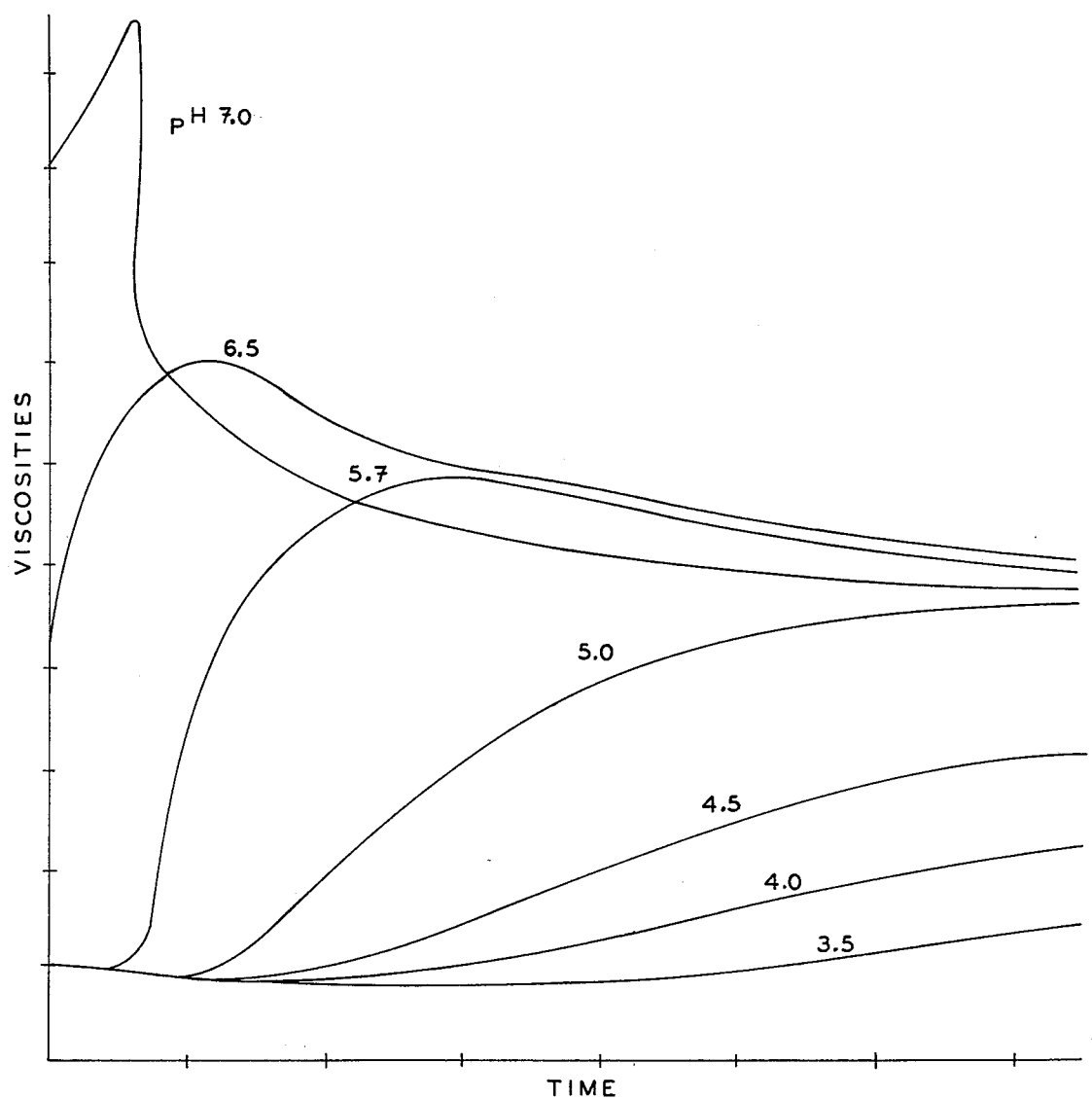
FIG. 4 shows a series of viscosity curves to demonstrate the effect of pH on the rate of reaction between glyoxal and cereal flour.

Fifty grams of a pregelled corn flour was dispersed in 440 ml of water in a Waring blendor for 2 minutes. With continued mixing for 1 minute, 5.6 ml of aqueous 40% glyoxal was added to the dispersion. The pH of this final mixture was 5.7. The mixture was transferred to the Brabender apparatus, and the reaction was allowed to proceed at 40° C. The procedure was repeated adjusting the pH with either 10% acetic acid or 5% sodium hydroxide solutions to give a series of reaction mixtures at varying pH levels. FIG. 4 shows the series of viscosity curves obtained by this example.

The pH sensitivity of the glyoxal-binder reaction is clearly demonstrated by these results. This method of reaction control may also be impractical, especially in glyoxal-binder applications to high solids content systems.

Glyoxal is known to exist in various monomeric, dimeric, trimeric and polymeric forms depending upon the physical state of the sample. The commercially available aqueous solutions are believed to contain primarily hydrated monomers and dimers of glyoxal. A solid, trimeric hydrated form can also be obtained as an item of commerce.

The following example will demonstrate that both forms of glyoxal can be employed within the scope of this invention but that the solid form exhibits a lower reactivity toward the hydroxyl binder components.

EXAMPLE 12

Figure 5:
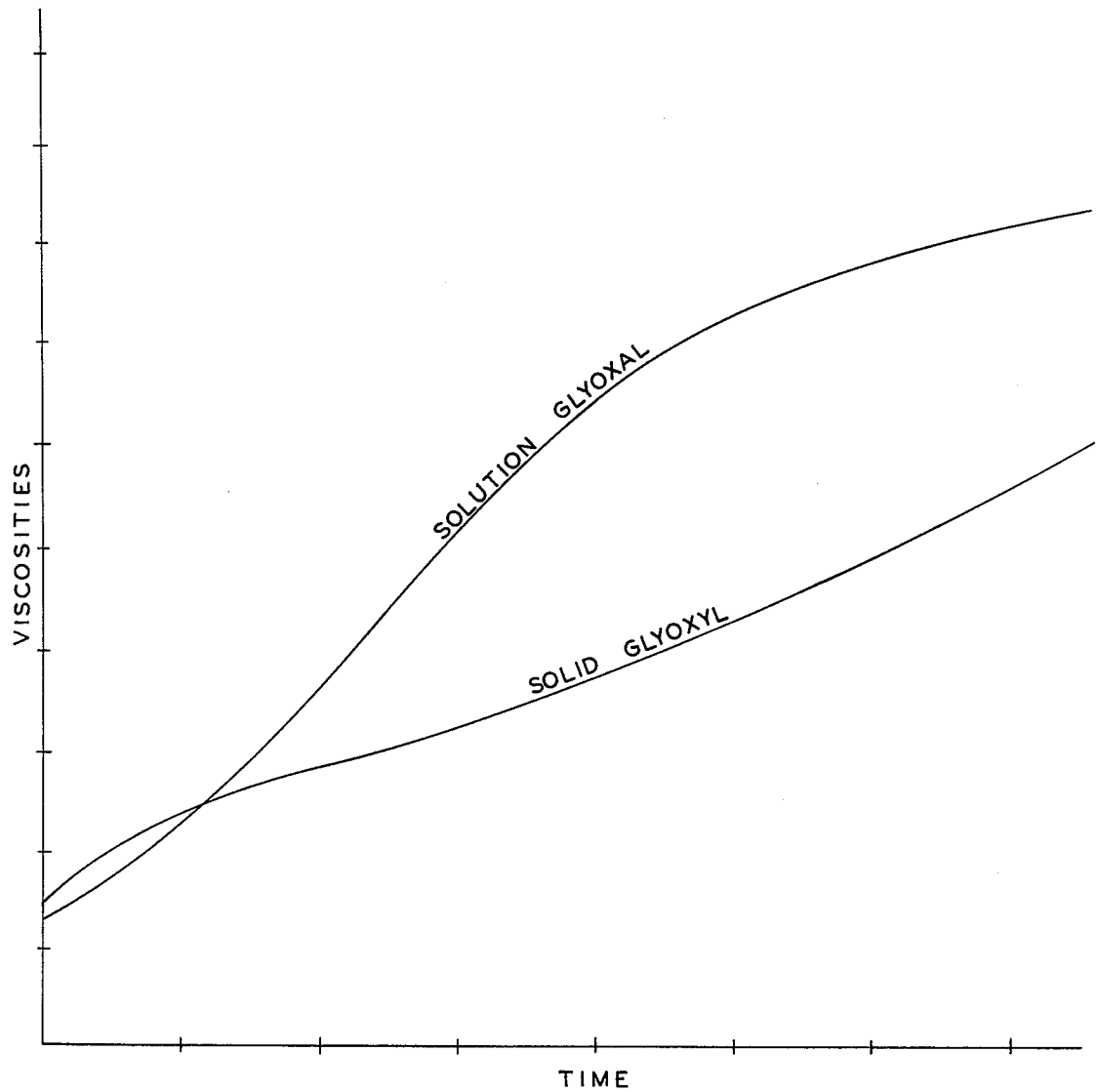
FIG. 5 illustrates viscosity curves which give a comparison of the reactivity of a solid glyoxal and a solution glyoxal.

One hundred fifty parts by weight of an acid modified cereal flour was dispersed in 339 parts by volume of water as in Example 10. With continued mixing, 11.4 parts by weight of 76% pure solid glyoxal trimer was added. The pH was adjusted to 5.8, and the reaction was carried out in the Brabender unit at 30° C. This procedure was repeated using 16.8 parts by volume of 40% glyoxal solution. This volume of solution gave an equivalent molar glyoxal concentration on a monomeric molecular weight basis. The viscosity curves of FIG. 5 give a comparison of the reactivity of these two glyoxal forms.

This means of reaction control by selection of the physical form of glyoxal has a serious disadvantage in that solid glyoxal trimer is many times more costly than the aqueous solution form.

According to the preferred embodiment of this invention, the use of inorganic salts for controlling the reaction between hydroxyl containing polymeric materials and glyoxal affords a most practical and economic advantage over the other previously cited means of reaction control.

The following example will illustrate the use of sodium chloride for retarding the rate of a reaction between aqueous glyoxal and an acid modified pregelled flour.

EXAMPLE 13

Figure 6:
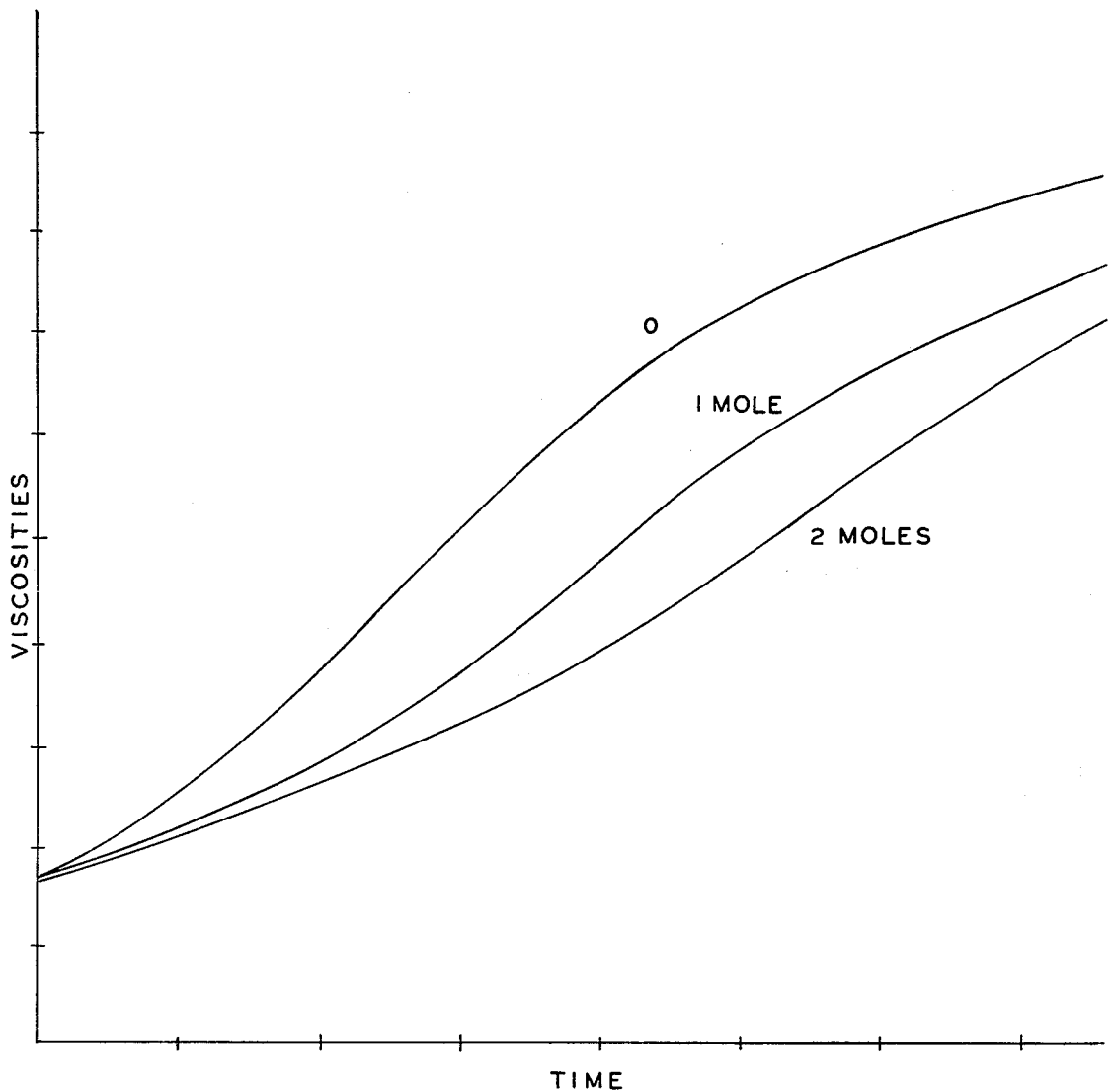
FIG. 6 illustrates curves which demonstrate that the rate-retarding effect upon the glyoxal crosslinking reaction is dependent upon sodium chloride concentration.

One hundred fifty parts by weight samples were dispersed in 333 parts by volume of water containing 0, 1 and 2 moles of dissolved sodium chloride in a Waring blendor. With continued mixing for 1 minute, 16.8 parts by volume of aqueous 40% glyoxal was added to each dispersion. These mixtures were adjusted to pH 5.8. The mixtures were transferred to the Brabender apparatus, and the reactions were allowed to proceed at 30° C. The resulting viscosity curves are exhibited in FIG. 6.

These viscosity curves demonstrate that the rate retarding effect upon the glyoxal crosslinking reaction is sodium chloride concentration dependent. This rate retardation employing salt can conveniently be overcome by rapidly elevating the temperature of the reaction system. This important feature was evident in earlier examples of the practical applications of glyoxal-binder-salt systems to foundry sand core moldings.

Salts other than sodium chloride were also found to significantly affect the rate of reaction between glyoxal and hydroxyl containing polymeric binders. Certain salts were actually discovered to accelerate the reaction whereas others almost entirely halted the reaction. These novel discoveries will be demonstrated by the following example.

EXAMPLE 14

For each reaction, 0.5 mole of the desired salt was dissolved in 443 ml of water in a Waring blendor. With continuous blending for 2 minutes, 50.0 g of a pregelatinized corn flour was added. The resulting slurry was blended for one additional minute while 7.0 ml of aqueous 40% glyoxal was added. After measuring the slurry pH, the mixtures were allowed to react in the Brabender apparatus at 30° C. The resulting viscosity curves from the glyoxal-flour reactions in the presence of several salts are given by FIG. 7.

With the exceptions of sodium fluoride (NaF) and ammonium chloride ($NH_4Cl$), the differences in reaction rates of glyoxal-flour in the presence of salts cannot be accounted for in terms of pH. For the series of reactions in the presence of the common ion as sodium, the glyoxal crosslinking reaction rates are observed to decrease with increasing anion size (Rate $F^-$ > Rate $Cl^-$ > Rate $Br^-$). Further, in the presence of chloride as the common ion, the reaction rates also follow the ionic size relationship (Rate $Li^+$ > Rate $Na^+$ > Rate $K^+$). This discovery of selective control by varying ionic size of the salt component allows for adjustment of the glyoxal-binder reaction rate to suit the requirements of the end-use application.

In the next example we demonstrate that the initial reaction or thickening of the cereal and glyoxal does not preclude making sand cores from the thickened mass. Sand cores were made in three different ways. First cores were made by dry mixing sand and cereal and adding the salt and glyoxal dissolved in water and thoroughly mixing. Secondly, the cereal was admixed with water containing the dissolved salt and the glyoxal was added and thoroughly mixed. This was done in a Waring blendor. The resultant formulation was added to sand and mixed. Thirdly, the cereal, water, salt and glyoxal were mixed in a Waring blendor, and the mixture heated in the Brabender/visco/Amylograph. This cooked mixture was then added to the sand and mixed thoroughly. In all three examples the same sand, cereal and mixer were used. Each example reduced to a formulation of 3120 gms sand, 62.5 gms cereal, 12.5 gms 40% glyoxal solution, 24.6 gms NaCl and 135 gms water. Cores were blown at 425° F for 45 seconds. Core and green sand properties were measured after mixing and ½ hour after mixing.

EXAMPLE 15

| Binder Added | % Compact-ability | (inches) 50 Jolt Deform-ation | (psi) Green Compression 0 | (psi) Green Compression ½ | Core Tensile psi 0 | Core Tensile psi ½ |
|---|---|---|---|---|---|---|
| Dry | 53 | 0.211 | 0.65 | 1.02 | 306 | 291 |
| Premixed | 52 | 0.193 | 0.61 | 1.13 | 300 | 288 |
| Cooked | 56 | 0.053 | 0.96 | 0.96 | 309 | 303 |

It can be seen that pre-reacting the binder components through the first reaction step does not affect the cores if made from sand mixes soon after the first reaction step is carried out. It can also be seen that the first step in the reaction apparently controls the green strength of the sand mix. This is shown by the increase in green strength with time for the first two mixes and the stable green strength of the third mix which was reacted through the first reaction step.

EXAMPLE 16

To further demonstrate the two step nature, a binder mix similar to the second one in the preceding example was dried in an oven at 70° C. This dried product was then ground on a laboratory hammermill and a sand mix made in the Hobart mixer using 10 gms of this product, 15 gms of water and 500 gms of A.F.S. sand. Cores were blown at 425° F, cured 45 seconds. These cores were too weak for tensile test measurements.

An example of a non-cereal water dispersible polyhydroxyl compound that reacts readily with glyoxal used alone or in combination with a cereal based product is demonstrated in the following example. Technical grade collagen protein and acid modified extruded corn flour were employed in the following formulation:

| | | |
|---|---|---|
| A.F.S. foundry sand | 500 | parts by wt. |
| Binder (flour-protein) | 10 | parts by wt. |
| Aqueous 40% glyoxal | 2 | parts by wt. |
| Water | 12.75 | parts by wt. |
| Sodium chloride | 2.25 | parts by wt. |

The binder portion and the sand were dry blended 1 minute at low speed in a laboratory Hobart mixer. Salt dissolved in the water and the glyoxal were added and mixing continued 4 minutes at middle speed. This sand mix was then used to blow cores, dog bone tensile specimens at 425° F, 45 seconds. The cores were cooled for 4 hours and the tensile strength was measured.

EXAMPLE 17

| % of Binder (Acid Modified-Extruded Flour) | % of Binder (Collagen Protein) | Avg. Tensile psi |
|---|---|---|
| 100 | 0 | 250 |
| 80 | 20 | 282 |
| 70 | 30 | 311 |
| 60 | 40 | 324 |
| 0 | 100 | 321 |

These results show that collagen protein functions efficiently as a sand core binder when used with the glyoxal, salt and water.

Since not all foundry cores or other products consisting of aggregate or particulate filler and a heat setting binder are formed in hot boxes or heated presses, this binder system was checked for suitability to wet shaping and subsequent baking of the wet shaped piece. It was found that the surface had a tendency to dry out prior to the set or reaction, which resulted in a "loosely bonded" surface. We found that this surface defect could be alleviated by coating of the shaped article with water prior to placement in the oven. This coating was most conveniently accomplished by spraying the surface with water using a pressure or atomizing sprayer. This type of curing requires green strength.

Example 18 shows a series of sand mixes made in a Simpson muller. Table A lists the mixes with amounts shown as % weight of sand. Mixing times are also shown. Table B lists the green properties measured immediately after mixing and after 1 hour of standing. Table C lists the cured properties at different times and using different ovens for cores shaped immediately after mixing and after 1 hour.

EXAMPLE 18

Table A.

Mixes and mulling times for CCB system core oil replacement

| Mix # | % CCB | % Glyoxal | % NaCl | % H₂O | Other | Wet Mull (min.) |
|---|---|---|---|---|---|---|
| 1, 6, 9 | 2 | 0.4 | 0.5 | 3.0 | | 10 |
| 2 | 2 | 0.5 | 0.5 | 3.0 | | 10 |
| 3 | 2 | 0.33 | 0.5 | 3.0 | | 10 |
| 4 | 2 | 0.4 | 0.5 | 3.0 | | 5 |
| 5 | 2 | 0.4 | 0.5 | 3.0 | | 15 |
| 7 | 1.5 | 0.3 | 0.5 | 3.0 | | 10 |
| 8 | 1.75 | 0.35 | 0.5 | 3.0 | | 10 |
| 10 | 2 | 0.4 | 0.5 | 3.0 | | 5 |
| 11 | 2 | 0.4 | 0.5 | 3.0 | | 5 |
| 12 | | | | 2.0 | 1% 818 , 1% Dacon 90 | 8 |
| 13 | 2 | 0.4 | 0.6 | 3.0 | | 10 |
| 14 | 2 | 0.4 | 0.4 | 3.0 | | 10 |
| 15 | 2 | 0.4 | 0.5 | 2.5 | | 10 |
| 16 | 2 | 0.4 | 0.5 | 3.5 | | 10 |
| 17 | 2 | 0.4 | 1.17 | 3.5 | | 10 |
| 18 | 2 | 0.4 | 0.5 | 3.0 | 1% Western Bentonite | 10 |
| 19 | 2 | 0.4 | 0.5 | 3.0 | 5% iron oxide | 10 |
| 20 | | | | 3.5 | 1% 818 , 1% phenolic | 6 |
| 21 | 2 | 0.4 | 0.5 | 3.0 | 0.1% Western Bentonite | 10 |
| 22 | 2 | 0.4 | 0.5 | 3.0 | 1% W. Bent. , 5% silica | 10 |
| 23 | 2 | 0.4 | 0.5 | 3.0 | 5% silica | 10 |
| 24 | 2 | 0.4 | 0.5 | 3.0 | 1% Southern Bentonite | 10 |

Table B.

Average Green Properties for Table A Mixes.

| Mix | % Moisture 0 | % Moisture 1 Hr | Green Comp.(psi) 0 | Green Comp.(psi) 1 Hr | % Compactability 0 | % Compactability 1 Hr | Jolt Deformation 0 | Jolt Deformation 1 Hr |
|---|---|---|---|---|---|---|---|---|
| 1, 6, 9 | 2.92 | 2.9 | 1.43 | 2.22 | 64.75 | 57.5 | 100+ | 100+ |
| 2 | 3.0 | 2.9 | 1.43 | 2.79 | 64.0 | 56.5 | 100+ | 100+ |
| 3 | 2.95 | 2.95 | 1.23 | 2.38 | 62.5 | 56.5 | 100+ | 100+ |
| 4 | 2.95 | 2.95 | .89 | 2.07 | 55.5 | 58.5 | 12 | 100+ |
| 5 | 2.85 | 2.85 | 1.64 | 2.34 | 64.0 | 57.5 | 100+ | 100+ |
| 7 | 3.0 | 3.0 | .75 | 1.46 | 57.0 | 60.0 | 14 | 100+ |
| 8 | 2.95 | 2.85 | 1.12 | 1.73 | 64.0 | 59.0 | 58 | 100+ |
| 12 | 2.35 | 2.2 | .81 | .89 | 52.5 | 50.0 | 15 | 55 |
| 13 | 2.95 | 2.85 | 1.04 | 2.03 | 60.5 | 55.5 | 40 | 100+ |
| 14 | 2.75 | 2.65 | 1.33 | 1.97 | 62.0 | 54.5 | 100+ | 100+ |
| 15 | 2.40 | 2.25 | 1.66 | 2.87 | 62.0 | 57.0 | 100+ | 100+ |
| 16 | 3.45 | 3.35 | .99 | 1.67 | 60.0 | 59.0 | 13 | 100+ |
| 17 | 3.45 | 3.4 | .86 | 1.76 | 60.5 | 60.0 | 7 | 100+ |
| 18 | 2.55 | 2.55 | 3.05 | 3.24 | 58.0 | 58.0 | | |
| 19 | 2.65 | 2.65 | 2.27 | 2.94 | 67.0 | 63.0 | | |
| 20 | 3.7 | 3.7 | .68 | .69 | 55.0 | 53.5 | (No. of jolts to .050 inches) | |
| 21 | 2.9 | 2.9 | 1.05 | 1.90 | 61.5 | 62.5 | | |
| 22 | 2.7 | 2.65 | 3.42 | 3.60 | 66.0 | 61.5 | | |
| 23 | 2.65 | 2.55 | 1.85 | 2.69 | 63.5 | 58.0 | | |
| 24 | 2.80 | 2.85 | 2.65 | 3.29 | 71.5 | 65.5 | | |

Table C.

Average cured properties.

| | | Sprayed | | Not Sprayed | | 1 Hr. Bench Life Sprayed | | 1 Hr. Bench Life Not Sprayed | |
|---|---|---|---|---|---|---|---|---|---|
| Mix # | Cure Time, Min. | Tensile (psi) | Hard** | Tensile (psi) | Hard** | Tensile (psi) | Hard** | Tensile (psi) | Hard** |
| 1, 6, 9 | 15 | 245.0 | 77.5 | 199.2 | 63.0 | 217.3 | 74.6 | 183.5 | 51.4 |
| | 30 | 209.2 | 73.0 | 180.8 | 61.3 | 169.8 | 70.5 | 147.3 | 42.0 |
| | 45 | 189.5 | 73.6 | 176.3 | 57.8 | 179.0 | 73.0 | 155.5 | 53.3 |
| | *45 | 215.2 | 78.0 | 169.3 | 67.2 | 192.0 | 79.8 | 170.3 | 61.5 |
| 2 | 15 | 304.0 | 77.5 | 165.0 | 65.0 | 153.0 | 57.0 | 145.5 | 58.5 |
| | 30 | 171.0 | 71.5 | 140.5 | 61.5 | 158.0 | 55.0 | 138.0 | 59.0 |
| | 45 | 154.0 | 66.0 | 125.0 | 59.5 | 135.0 | 75.0 | 122.5 | 54.5 |
| | *45 | 165.0 | 69.5 | 139.5 | 64.5 | 190.5 | 67.0 | 143.0 | 60.0 |
| 3 | 15 | 274.0 | 68.5 | 226.5 | 68.5 | 220.0 | 58.5 | 217.5 | 62.0 |
| | 30 | 251.0 | 69.0 | 196.0 | 65.5 | 197.0 | 56.5 | 180.5 | 61.0 |
| | 45 | 204.0 | 65.0 | 163.5 | 64.5 | 185.5 | 59.0 | 145.0 | 60.0 |
| | *45 | 248.0 | 66.5 | 176.5 | 66.0 | 212.0 | 84.0 | 182.0 | 64.5 |
| 4 | 15 | 234.5 | 81.5 | 207.0 | 70.5 | 215.0 | 90.0 | 183.0 | 59.5 |
| | 30 | 206.5 | 80.0 | 168.0 | 65.5 | 166.0 | 86.5 | 159.5 | 56.0 |
| | 45 | 239.0 | 81.5 | 160.0 | 70.0 | 149.0 | 79.0 | 142.5 | 59.0 |
| | *45 | 208.0 | 92.5 | 164.0 | 77.5 | 192.0 | 84.5 | 164.5 | 62.5 |
| 5 | 15 | 251.0 | 80.5 | 201.0 | 61.5 | 179.0 | 66.5 | 185.0 | 76.5 |
| | 30 | 214.0 | 83.5 | 182.5 | 60.5 | 205.5 | 79.0 | 157.0 | 47.0 |
| | 45 | 189.5 | 78.5 | 165.5 | 55.0 | 155.0 | 75.5 | 153.0 | 46.0 |
| | *45 | 216.0 | 86.5 | 187.0 | 67.0 | 187.5 | 77.0 | 152.0 | 52.5 |
| 7 | 15 | 256.5 | 81.0 | 235.5 | 73.5 | 208.5 | 79.5 | 200.0 | 65.5 |
| | 30 | 209.0 | 78.5 | 184.5 | 65.0 | 193.0 | 71.5 | 171.0 | 57.0 |
| | 45 | 212.0 | 69.5 | 172.0 | 70.0 | 185.0 | 68.5 | 175.5 | 59.0 |
| | *45 | 209.5 | 81.5 | 213.0 | 72.5 | 168.0 | 70.5 | 165.0 | 66.5 |
| 8 | 15 | 269.5 | 75.0 | 220.5 | 65.0 | 187.5 | 70.0 | 197.5 | 59.0 |
| | 30 | 218.5 | 77.0 | 183.5 | 57.4 | 168.0 | 70.0 | 149.5 | 54.0 |
| | 45 | 217.0 | 78.0 | 156.0 | 54.0 | 163.0 | 71.0 | 172.5 | 53.5 |
| | *45 | 204.5 | 76.0 | 175.0 | 71.0 | 191.0 | 76.5 | 182.0 | 59.5 |
| 12 | 15 | | | 70.5 | 36.5 | | | | |
| | 30 | | | 116.0 | 58.5 | | | 97.0 | 58.5 |
| | 45 | | | 164.0 | 65.0 | | | 160.0 | 65.0 |
| | 60 | | | 213.0 | 69.0 | | | 211.0 | 69.5 |
| 13 | 15 | 266.0 | 92.0 | 186.0 | 67.5 | 241.0 | 90.5 | 168.5 | 53.5 |
| | 30 | 223.5 | 95.5 | 187.5 | 65.5 | 167.5 | 78.0 | 143.5 | 53.5 |
| | 45 | 223.0 | 90.0 | 184.5 | 61.0 | 178.0 | 84.0 | 198.0 | 81.5 |
| | *45 | 233.0 | 92.5 | 199.5 | 71.5 | 143.5 | 52.0 | 176.0 | 67.0 |
| 14 | 15 | 261.0 | 87.5 | 189.0 | 58.0 | 190.0 | 75.0 | 171.0 | 52.0 |
| | 30 | 205.5 | 81.0 | 171.0 | 49.5 | 183.0 | 72.0 | 149.0 | 41.0 |
| | 45 | 179.5 | 73.5 | 151.0 | 51.0 | 168.0 | 67.0 | 172.5 | 77.5 |
| | *45 | 218.0 | 92.5 | 144.0 | 58.5 | 131.0 | 42.0 | 134.5 | 54.0 |
| 15 | 15 | 250.5 | 92.5 | 174.5 | 49.5 | 153.0 | 65.0 | 139.0 | 38.0 |
| | 30 | 206.0 | 86.5 | 152.0 | 45.5 | 130.0 | 67.5 | 131.0 | 29.0 |
| | 45 | 184.0 | 73.5 | 150.5 | 42.0 | 145.5 | 65.0 | 123.0 | 25.5 |
| | *45 | 189.5 | 87.5 | 141.0 | 52.5 | 166.0 | 71.0 | 147.0 | 54.0 |
| 16 | 15 | 307.5 | 90.5 | 236.5 | 68.5 | 236.5 | 72.5 | 214.5 | 58.5 |
| | 30 | 252.0 | 88.5 | 214.0 | 66.5 | 197.0 | 68.5 | 187.5 | 57.5 |
| | 45 | 233.0 | 94.0 | 206.0 | 67.0 | 201.5 | 70.0 | 180.0 | 59.5 |
| | *45 | 274.5 | 92.5 | 226.5 | 71.0 | 221.5 | 83.0 | 187.0 | 63.0 |
| 17 | 15 | 364.0 | 88.5 | 251.0 | 84.0 | 280.5 | 82.5 | 234.0 | 79.0 |
| | 30 | 293.0 | 84.0 | 252.5 | 71.5 | 214.5 | 77.0 | 206.0 | 77.0 |
| | 45 | 270.0 | 81.5 | 251.5 | 79.5 | 217.5 | 84.0 | 188.0 | 70.0 |
| | *45 | 291.5 | 85.0 | 254.5 | 82.0 | 253.0 | 86.0 | 219.5 | 77.5 |
| 18 | 15 | 168.3 | | 90.0 | | 117.6 | | 90.6 | |
| | 30 | 98.0 | | 78.3 | | 100.3 | | 70.6 | |
| 19 | 15 | 265.3 | | 207.6 | | 240.0 | | 193.3 | |
| | 30 | 224.3 | | 189.0 | | 187.0 | | 146.0 | |
| 20 | 15 | | | 187.0 | | | | 138.6 | |
| | 30 | | | 210.6 | | | | 209.0 | |
| | 45 | | | 209.3 | | | | 202.0 | |

Table C.-continued

| | | Average cured properties. | | | | | | | |
|---|---|---|---|---|---|---|---|---|---|
| | Cure | | | | | 1 Hr. Bench Life | | | |
| | Time, | Sprayed | | Not Sprayed | | Sprayed | | Not Sprayed | |
| Mix # | Min. | Tensile | Hard** | Tensile | Hard** | Tensile | Hard** | Tensile | Hard** |
| | 60 | | | 222.6 | | | | 201.0 | |
| 21 | 15 | 253.4 | | 163.0 | | 234.6 | | 157.3 | |
| | 30 | 187.6 | | 152.0 | | 172.0 | | 142.0 | |
| 22 | 15 | 225.0 | | 183.6 | 177.3 | 154.6 | | | |
| | 30 | 177.0 | | 155.0 | | 130.3 | | 124.6 | |
| 23 | 15 | 347.3 | | 277.6 | | 287.6 | | 215.6 | |
| | 30 | 289.6 | | 273.3 | | 223.6 | | 190.6 | |
| 24 | 15 | 194.6 | | 166.0 | | 186.6 | | 162.3 | |
| | 30 | 158.3 | | 152.6 | | 159.3 | | 147.3 | |

*Uncirculated air oven.
**1st three mixes scraped side (up) tested for hardness; remaining cores tested on smooth side (down).

These data show the utility of the binder system for a mix, shape and bake type of manufacturing process. The development of green strength coincides with the earlier proposed theory of being a function of the first step in the overall reaction. The data also shows that the curing rate of this system is much faster than for more conventional dry oil or resin binders in the oven process.

The following example is presented to show the advantage of this binder system in lowering heat and time requirements for curing. These core samples were made from a sand mix containing 2% extruded acid modified corn flour, 0.5% NaCl, 0.4% glyoxal and 3.0% $H_2O$ based on the weight of sand. This mix was made on a Simpson muller using .1 minute dry blend and 10 minutes wet mixing. These cores were not sprayed with water.

EXAMPLE 19

| Tensile Strength at Cure Temperature | | | |
|---|---|---|---|
| Time (Min.) | 250° F | 300° F | 350° F |
| 15 | — | — | 233 |
| 30 | 394 | 312 | 218 |
| 45 | 273 | 282 | 190 |
| 60 | 275 | 242 | — |

This data shows the rapid curing possible with the binder system. In the previous example the conventional oil and resin binders required 60 min. in a 350° F circulating oven to attain strengths approaching maximum. The binder of the present invention requires less than 15 minutes at 350° F and approximately 30 minutes at 250° F. Thus the foundry industry could save fuel costs and/or accelerate production.

In many of the foregoing examples gelatinized acid modified corn flour was used. The use of glyoxal and alkali halide with cereal products is not limited to this general type flour. Any water dispersed or dispersible hydroxyl containing material which reacts with glyoxal has application to the use of salt to control the reaction. One example of a non-cereal product, collagen protein, has already been shown. Sugars, including those which are cereal derived such as liquid brewers adjunct which is an enzyme hydrolyzed product from corn starch, are other potentially useful products. In order to employ a different hydroxyl source, the amount of glyoxal needed to obtain a fairly continuous bonding network to provide the desired cured properties may have to be adjusted. Thus, starting with a low molecular weight saccharide like sucrose, a greater weight of glyoxal may be necessary to achieve crosslinking so that properties of the finished article will resemble those attainable with more conventional crosslinking resin systems.

The following examples are presented to demonstrate that the low molecular weight sugars may be used to make foundry cores.

EXAMPLE 20

10 gms of sucrose, a disaccharide, were mixed with 500 gms of silica sand for 1 minute at low speed in a Hobart mixer. 2 gms water, 10 gms of glyoxal 40% solution and 2.5 gms of KCl were mixed in a small beaker until the KCl was dissolved. This solution was added to the sand-sugar admixture and mixed 2.5 minutes at the second speed of the Hobart mixer. A core dog bone specimen was rammed and dried in a circulating oven at 250° F for 15 minutes. This specimen had a tensile strength of 347.5 pounds per sq. inch.

EXAMPLE 21

The same formulation as in Example 20 was mixed 4 minutes and the pH adjusted to 6.85 by adding 3 drops of 5% NaOH. The NaOH was added to accelerate stiffening of the sand mix. Cores were blown into a single cavity dog bone hot box at 425° F with 45 seconds cure time followed by 4 hours of cooling. These cores gave tensile strengths of 270 psi.

EXAMPLE 22

The procedure of Example 20 was repeated using the disaccharide maltose as a substitute for sucrose. This formulation was mixed 4 minutes at the second speed in a Hobart mixer. Dog bone cores were blown at 425° F curing for 30 and 45 seconds.

30 seconds — avg. 212 psi tensile
45 seconds — avg. 241.3 psi tensile

EXAMPLE 23

A sample of commercial corn syrup with 82% solids, 63-65% dextrose equivalent, was used as above, but 12.5 gm of syrup replaced the sugar and water. Cores were blown into a 425° F hot box and cured for 45 seconds. Additional cores were rammed and baked for 5 min. in a 350° circulating oven.

Hot box — 290 psi tensile
Baked — 302.5 psi tensile

These examples clearly show the ability of the crosslinking system to function with sugars.

In regard to the use of a cereal based hydroxyl source, particularly for bonding particulate masses into composite articles like foundry cores, we have found that a reduced molecular weight cereal grain starch material is particularly advantageous. We have found that such a material must be both well gelatinized and reduced in molecular weight. One means of determining approximate molecular weights is to measure the alkaline viscosity of the material. This can be accomplished by dispersing the sample, 1.3 or 5.2 gms, in 50 ml of 1N KOH. A micro bowl Waring Blendor is suitable for preparing these dispersons. The dispersion is allowed to stand 1 minute for de-airation and a 10 cc aliquot is pipetted into a #200 Cannon Fenske viscometer immersed in a 40° C water bath. The sample is moved into the ready position in the viscometer and held there for a time sufficient to assure temperature equilibrium of the sample and bath. A total elapsed time of 12 minutes is used, including the 1 minute of mixing and the 1 minute of de-airation. The time for the sample to flow between the measured marks on the viscometer is read and recorded as the Alkaline Viscosity at 1.3 or 5.2 gms.

We have found that these A.V. values have double utility. First, if the particular sample of gelatinized amylaceous material has an A.V. greater than about 20 seconds at 1.3 gm/50 cc 1N KOH, there is a tendency for difficult sand mix formation. Secondly, low levels of glyoxal are needed, which do not establish complete three dimensional crosslinked networks. We have found that the amount of glyoxal can be estimated for saccharide molecules by comparing A.V. data of the unknown with that of sucrose. This is done by measuring the A.V. of both sucrose and the unknown at a minimum of 2 concentrations and determining the A.V. of the 1N KOH. Then using the following relationships:

N = measured A.V. in seconds
$N_o$ = 1N KOH in seconds
$N_r$ = $N/N_o$
$N_{sp}$ = $N_r - 1$ expressing the concentrations in gm/cc, plotting $N_{sp}$ vs. gm/cc and extrapolating to a [N] value at gm/cc = 0; the approximate amount of glyoxal is shown by the amount needed for sucrose times the ratios of [N] for the sample and sucrose in the form [N] sucrose ÷ [N] sample. If a 2:1 mole ratio of glyoxal to sucrose is needed, this calculation will allow approximating the same mole ratio for the material of unknown molecular weight.

We have found that for making foundry cores the particular cereals which show unexpected benefits are the gelatinized products with an A.V. of less than about 20 seconds at 1.3 gm/50 cc 1N KOH and of less than 100 sec. at 5.2 gm.

The following examples will demonstrate the desired range of cereal properties using starting materials other than corn flours which have been shown previously. Example 24 shows the use of sorghum flours.

Product A was made by treating 500 gms of red sorghum flour with 0.3% concentrated sulfuric acid and sufficient water to bring the acidified flour to 28% moisture. This was accomplished by mixing 20 minutes in a laboratory Hobart mixer at low speed. This flour was reacted with the acid and gelatinized in a Wayne laboratory extruder with a ¾ inch diameter barrel and a 20:1::L:D ratio, with a 2.1 compression screw, with the feed end 2/3 of the length at 220° F and the discharge end ⅓ at 320° F using a 52 rpm screw speed. After cooling the extrudate to room temperature, it was crushed and ground through a hammermill. The ground product was neutralized with gaseous ammonia until a 10% flour in water slurry gave a pH of 3.7-3.8.

Product B was identical except white sorghum flour and 0.2% sulfuric acid were used as starting materials.

Cores were made in a single cavity dog bone hot box using a sand mix with 2% cereal, 0.4% glyoxal 40% aqueous solution, 0.5% NaCl and 2.5% water, amounts based on the weight of sand.

EXAMPLE 24

| Product | % Cold Water Solubles | 1.3 gm Alk. Vis. (sec.) | Core Tensile psi |
|---------|----------------------|-------------------------|------------------|
| A       | 73.2                 | 11.8                    | 230.0            |
| B       | 80.0                 | 12.6                    | 211.3            |

EXAMPLE 25

Eight 500 gm samples of yellow corn flour were blended with 0.2 to 0.4% $H_2SO_4$ and tempered to 18-24% moisture. The specific addition levels for each sample are shown in Table D. After addition of acid and water, the samples were blended for 20 minutes in a Hobart mixer at low speed. The samples were then processed in a laboratory extruder employing a 220° F rear barrel temperature and 280° F for the discharge end ⅓ length. The extruder was run at 50 rpm with a 2:1 compression screw. The extruded samples were cooled to room temperature and ground on a hammermill. The samples were neutralized with gaseous ammonia until a 10% slurry of the sample gave a pH of 3.5 – 4.1. The products were then tested for cold water solubles, reducing sugars, alkaline viscosities, and ability to be used as hot box binders with glyoxal and salt.

The results are shown in Table D. These results clearly show that the alkaline viscosity must be kept below 20 seconds using our test method and a 1.3 g sample if the product is to be preferred for making foundry sand cores by the hot box method. The data also shows that cold water solubles and reducing sugars are not as good as criteria for judging acceptability of a product to be used as a foundry core binder.

Table D.
Amounts of acid and moisture for products Example 25, analytical and use data for products

| Product | % $H_2SO_4$ | % $H_2O$ | % CWS | % Reducing Sugars | Alkaline Viscosity 1.3 g | Slurry pH 10% Solids | Core Tensile, psi | Tensile % of Control |
|---------|-------------|----------|-------|-------------------|--------------------------|----------------------|-------------------|----------------------|
| 25A     | 0.30        | 18       | 88.4  | 0.9               | 13.2                     | 3.9                  | 211.9             | 95.7                 |
| 25B     | 0.30        | 22       | 83.8  | 1.7               | 13.5                     | 3.5                  | 174.4             | 75.1                 |
| 25C     | 0.30        | 26       | 66.5  | 2.5               | 13.2                     | 4.1                  | 196.3             | 84.4                 |
| 25D     | 0.40        | 22       | 83.8  | 4.2               | 11.3                     | 3.6                  | 217.3             | 93.8                 |
| 25E     | 0.40        | 18       | 83.5  | 5.0               | 10.8                     | 4.1                  | 233.3             | 100.5                |
| 25F     | 0.20        | 26       | 69.7  | 1.3               | 18.3                     | 3.8                  | 129.4             | 55.6                 |
| 25G     | 0.20        | 22       | 84.1  | 1.6               | 14.2                     | 3.6                  | 173.1             | 74.5                 |
| 25H     | 0.30        | 22       | 83.7  | 2.2               | 13.0                     | 3.7                  | 190.6             | 82.3                 |

The next example shows the use of corn starch.

EXAMPLE 26

In this example a series of acid modified-extruded starches was produced in which the initial acid level was varied in order to determine the reaction conditions and physical properties required to obtain optimum tensile strength in hot box cores.

Five hundred gram samples of pearl corn starch were blended with 0.10% to 0.30% sulfuric acid and tempered to 26% moisture as summarized by the data in Table E. After the addition of acid and water, the starch mixtures were blended for 20 minutes in a Hobart mixer and processed in the Wayne laboratory extruder (R.T. 220° F; F.T. 270° F; speed 52 rpm). The extrudates were cooled to room temperature and ground to pass through a herringbone screen on a Mikro Sampl Mill. The products were neutralized with gaseous ammonia and tested for cold water solubles, reducing sugars, alkaline viscosities and tensile strengths in hot box sand cores (in combination with glyoxal and salt).

Table E.

Acid levels, physical properties and tensile strengths of the five products made in Example 26.

| Product | % $H_2SO_4$ | % Cold Water Solubles | % Reducing Sugars | Alkaline Viscosity 1.3 g | Alkaline Viscosity 5.2 g | Slurry pH, 10% Solids (after Neut.) | Tensile Strength, psi | % Control |
|---|---|---|---|---|---|---|---|---|
| 26A | 0.10 | 69.3 | 0.5 | 14.8 | 67.0 | 4.0 | 172.5[a] | 75.0 |
| 26B | 0.133 | 73.4 | 1.0 | 12.0 | 32.4 | 4.1 | 226.7[b] | 94.9 |
| 26C | 0.167 | 76.9 | 2.8 | 10.7 | 22.0 | 3.6 | 183.8[b] | 77.0 |
| 26D | 0.20 | 89.2 | 4.9 | 10.0 | 17.3 | 4.0 | 163.1[c] | 67.3 |
| 26E | 0.30 | 93.5 | 8.2 | 9.7 | 14.2 | 3.4 | 123.1[c] | 50.7 |

[a]Control of 230.0 psi
[b]Control of 238.8 psi
[c]Control of 241.9 psi

The results shown in Table E indicate that the best product was produced with 0.133% acid for the cross-linking ratio chosen and that tensile strengths fairly comparable to those of corn flour-based products could be obtained.

EXAMPLE 27

In this example, typical products were made from yellow corn grits.

A. A 500 g sample of yellow corn grits, generally referred to in the trade as cones or Kix cones, was blended with 0.3% sulfuric acid and tempered to 28% moisture. After blending in a Hobart mixer for 20 minutes to insure uniform distribution of reagents, the material was processed on the Wayne laboratory extruder (R.T., 220° F; F.T., 300° F; speed, 52 rpm). The product was ground to pass through a fine herringbone screen, neutralized with gaseous ammonia and tested for solubles, reducing sugars, alkaline viscosity, pH and tensile strength in sand cores.

B. Part A was repeated with 500 g of yellow corn grits tempered to 22% moisture and containing 0.4% sulfuric acid.

| Product | % Cold Water Solubles | % Reducing Sugars | Alkaline Viscosity, 1.3 g | Slurry pH, 10% Solids | Tensile Strength psi |
|---|---|---|---|---|---|
| 5A | 81.5 | 2.5 | 11.1 | 3.8 | 220.6 |
| 5B | 86.5 | 3.1 | 10.9 | 3.5 | 230.0 |

EXAMPLE 28

In this example the importance of particle size on tensile strength will be demonstrated.

Five of the products described in Example 1 were reground on the Mikro Sampl Mill to pass through an extra fine herringbone screen. The materials were retested in sand cores for tensile strength and the results compared with the original values. As apparent from the data in Table F, all of the values obtained after regrinding were higher than before. The greater the particle size decrease, the greater was the increase in tensile strength.

Table F.

Tensile strength and particle size of five products from Example 25 before and after regrinding.

| Product | % On 100 Mesh | Tensile Strength, % Control | % On 100 Mesh | Tensile Strength, psi | (% Control) |
|---|---|---|---|---|---|
| 25B | 38.8 | 75.1 | 4.2 | 196.3 | ( 89.5) |
| 25D | 24.0 | 93.8 | 0.6 | 224.4 | (102.5) |
| 25E | 9.0 | 100.5 | 0.2 | 225.6 | (103.0) |
| 25F | 48.0 | 55.6 | 2.4 | 168.3 | ( 76.7) |
| 25G | 44.0 | 74.5 | 5.4 | 201.4 | ( 91.4) |

EXAMPLE 29

The next example demonstrates the use of a commercial acid modified corn starch of 80 fluidity which was extruded after tempering to 28% moisture. After cooling and grinding, cores were made and tested for tensile as in the preceding example.

| Starting Material | CWS | Alkaline Viscosity 1.3 gm | Alkaline Viscosity 5.2 gm | Tensile |
|---|---|---|---|---|
| 80 fluidity corn starch | 59% | 17 | 83 | 78.9% of control |

The control was corn flour of Example 1.

EXAMPLE 30

In this example corn dry mill flour was extrusion cooked as is customary to make a green sand cereal core binder having about 45–50% CWS and a 1.3 g alkaline viscosity between 75 and 90 seconds. This product was acid modified to give different alkaline viscosities by changing the time of acid modification. 300 gms of extruded flour was acidified with HCl gas to give a pH of 2.07–2.08 in a 10% aqueous slurry. These flour samples were placed in covered glass jars and heated in an oven for different lengths of time. After heating, samples were neutralized with $NH_3$ gas to pH between 3.7 and 5.1. Cores were made using a dog bone single cavity hot box, 2% of these binders, 0.4% glyoxal 40% solution and 2.5% water, amounts based on the weight of sand.

| Product | Time at 70° C | Alkaline Viscosity | | Core Tensile psi |
|---|---|---|---|---|
| | | 1.3 g | 5.2 g | |
| A | 3 hours | 16.7 | 99.0 | 177.5 |
| B | 2 hours | 21.5 | 183.0 | 150.0 |

Mix B was more difficult to handle as the sand mix tended to be stiff. This demonstrates the preferred upper limit of A.V. for the cereal binder used to make sand cores. Higher alkaline viscosity products can be used but in most cases would not be preferred.

EXAMPLE 31

The products D and E from Example 26 showed rather poor tensile strengths when used with 0.4% B.O.S. glyoxal 40% aqueous solution as in that example. These products had low alkaline viscosities in the range of those preferred. By using the alkaline viscosity data to calculate [N] as described earlier, values for [N] of 3.1 and 2.4 were obtained. This indicates that substantially more glyoxal would be required, such as about 2.2% and 2.8%. Taking this into account, cores were made in the hot box using the same procedure and amounts as in Example 26 with 1.6% glyoxal 40% solution in place of 0.4% B.O.S.

| Binder from Example 26 | Avg. Tensile psi | [N] |
|---|---|---|
| 26D | 232 | 3.1 |
| 26E | 242 | 2.4 |

Compared to tensile strengths of 163 and 123, this is a dramatic increase. This demonstrates the use of low range alkaline viscosity materials.

The preceding examples have shown the use of amylaceous materials as the hydroxyl source with three different general process routes to arrive at a gelatinized hydrolyzed product. Normally one would not expect to find a marked superiority for a process route, but we unexpectedly discovered that acid modification followed by extrusion gelatinization was superior to acid modification of an already extruded product or concurrent gelatinization and acid modification.

We have established that for foundry core use a cereal product which is gelatinized and has alkaline viscosities with the general upper limit of 20 seconds for a 1.3 gm sample and 100 seconds for a 5.2 gm sample tested in 50 ml of 1N KOH is desired. These limits are preferred for baked or hot box foundry core applications, but should not be construed as limiting the scope of this invention.

The concurrent process of acid modifying and gelatinizing demands such rigorous control over conditions that it appears unfeasible in commercial practice. The choice between acid modifying or gelatinizing as the first step would appear to be a matter of preference. When corn flour is gelatinized in an extruder-expander, the alkaline viscosity of the flour is reduced. It would thus appear that this would provide a start toward the attainment of the desired acid modified alkaline viscosities. In practice, the inverse occurs.

The following example illustrates this. 300 gm samples of an extruded-expanded corn flour with an alkaline viscosity of about 80 seconds (1.3 gm sample) and a raw corn flour of alkaline viscosity about 150 seconds were treated with dry HCl gas to reduce the pH to about 2.1 when tested in a 10% aqueous slurry. The flour samples were heated in an oven in glass jars at 70° C for the specified time. After removal from the oven, the samples were neutralized with $NH_3$ gas.

EXAMPLE 32

| Starting Material | Time (hrs.) | Alkaline Viscosity (sec.) | |
|---|---|---|---|
| | | 1.3 gm | 5.2 gm |
| Pregelled flour | 3 | 13.0 | 51.0 |
| Pregelled flour | 4 | 11.8 | 36.5 |
| Raw flour | 4 | 10.9 | 28.9 |

This was repeated using a raw corn flour and three different extruded-expanded corn flours with 1.3 g alkaline viscosities between 75 and 90 seconds and CWS between 45 and 50%. All samples were kept in the same oven for 3 hours at 70° C.

| Starting Material | Acid pH | Alkaline Viscosity (sec.) | | % CWS | % Reducing Sugars |
|---|---|---|---|---|---|
| | | 1.3 g | 5.2 g | | |
| 1 Pregelled 816 | 2.08 | 10.0 | 17.9 | 82.9 | 5.78 |
| 2 Pregelled 817 | 2.00 | 10.1 | 17.5 | 85.2 | 6.67 |
| 3 Pregelled 818 | 2.07 | 10.1 | 19.8 | 87.4 | 6.64 |
| 4 Raw corn | 2.12 | 9.7 | 19.4 | 49.3 | 5.81 |

EXAMPLE 33

Commercial acid modified corn flour which was processed at 168° F for 10 minutes with dry HCl at pH 2.3 and subsequently neutralized to about pH 4.0 with ammonia was used to prepare a binder. This starting material had a 1.3 g alkaline of about 17.8 seconds and CWS of about 13%. After extrusion through a Wayne laboratory extruder with a discharge set at 340° F and the feed set at 200° F, the hammermilled product had a 1.3 g alkaline viscosity of 12.5 seconds and a 5.2 gm viscosity of 42.0 seconds. This will be called Product 3.

This product and products which are duplicates of Nos. 3 and 4 from the preceding example (called 1 and 2 in this example) were screened to give 4 samples of each product with a narrow particle size range. These samples were analyzed for 1.3 gm alkaline viscosities and pH's.

| Alkaline viscosity distribution of products by particle size: | | | | | |
|---|---|---|---|---|---|
| | No. 1 | | No. 2 | | No. 3 | |
| | A.V. | pH | A.V. | pH | A.V. | pH |
| On 100 | 26.1 | 3.7 | 19.0 | 3.5 | not available | |
| On 200 | 20.1 | 3.9 | 14.7 | 3.6 | 13.2 | 3.5 |
| On 325 | 17.7 | 4.2 | 13.9 | — | 13.3 | 3.5 |
| Thru 325 | 16.1 | 4.6 | 12.4 | 4.1 | 13.0 | 3.6 |
| Composte | 17.0 | 3.5 | 15.0 | 3.7 | 12.5 | |

No. 1 is acid modified extruded flour
No. 2 is acid modified flour
No. 3 is extruded acid modified flour From these data it is obvious that the extrusion of a previously modified product results in a more uniform binder. This uniformity, coupled with a more rapid process, results in an unexpected and more desirable method for the production of acid modified binders within the scope of this invention.

EXAMPLE 34

This example will demonstrate the use of the heat accelerated curable binder system of the present invention for the production of fiberboard. A slurry of 20 g of acid modified corn flour in 100 g of water containing 4.8 g of sodium chloride was intimately mixed with 200 g of wood fibers. The mixture was dried at 50° C for about 15 hours and then thoroughly blended with 10 ml of a solution containing 1.6 g of glyoxal. The mixture was placed in a circular mold under about 1000 psi and cured for 10 minutes at about 300° F. The resulting fiberboard disk had properties comparable to similar fiberboard disks employing a synthetic phenol-formaldehyde resin as the binder system. The wood fibers may be sawdust, wood chips or wood particles.

EXAMPLE 35

This example will illustrate the use of the binder system of the present invention for the production of a wet formed, pressed fiberboard. A solution of 40.0 g of 40% glyoxal and 4.5 g of sodium chloride in 600 ml of warm water was used to prepare a slurry with 80 g of wood fibers. Twenty g of acid modified corn flour was intimately blended into the fiber slurry for 10 minutes to insolubilize the glyoxal via hemiacetal formation with the corn flour. This mixture was de-watered on a vacuum filter to give a preform which was pressed and cured at about 230° F for 20 minutes. The finished board had an approximate density of 0.7 g/cm$^3$ and a hard, glossy surface.

EXAMPLE 36

This example will demonstrate the use of glutaric dialdehyde in place of glyoxal in a heat accelerated curable binder system of the present invention. A solution of 40 ml of aqueous 25% glutaric dialdehyde and 5 g of sodium chloride in 560 ml of warm water was used to prepare a slurry with 80 g of wood shavings and 20 g of acid modified corn flour. After thorough blending for 20 minutes, the slurry was filtered through a cloth and further de-watered while being formed into a mat under pressure. The resulting mat was cured in a press under 300 psi at about 200° F for 30 minutes. The finished board had an approximate density of 0.6 g/cm$^3$ and a hard, glossy surface.

EXAMPLE 37

This example will demonstrate the use of the heat accelerated curable system of the present invention as an unfilled thermosetting resin. A slurry of 200 g of an acid modified corn flour in 390 g of a solution consisting of 4.1% glyoxal, 11.6% sodium chloride and 84.3% water was prepared in a high speed blendor. The resulting slurry was cast into several disk shaped pans. Several castings were cured into hard plastic-like disks by heating in an oven at 70° C for about 4 hours. Other castings set into disks upon standing at room conditions for about one week. A third group of castings was cured rapidly at about 170° C for 10 minutes during which time the rapid evaporation of water caused the formation of foamed thermoset articles.

The polyaldehyde used in the present invention has the following general formula: $OHC-(CH_2)_n-CHO$, and where $n$ is a whole number integer from 0 to 12.

A bonded particulate article manufactured by the method of the present invention may comprise 80%–90% particulate matter, 1%–20% binder system, with the latter being comprised of 60%–84% saccharide material, 3%–27% glyoxal and 8%–32% alkali halide.

A preferred method of manufacturing a foundry core under the present invention comprises the steps of mixing sand and a heat-accelerated curable binder system wherein the binder system is produced by the following steps: crosslinking 1%–3% of saccharide-containing matter with 0.15%–3% of 40% glyoxal aqueous solution; controlling the reaction by the use of 0.3%–1.0% alkali halide as a catalyst using 0%–4% water, 0%–10% bentonite, 0%–10% wood flour, 0%–10% Silica flour, 0%–10% iron oxide, and 0%–1% of a material selected from the group comprising wax and asphalt emulsion; and forming the mixture to desired shape and causing it to cure to a hardened state.

Good results may be obtained by selecting the saccharide-containing material from the group comprising sucrose, maltose, corn syrup, corn syrup solids, hydrolyzed pregelled starches, hydrolyzed pregelled flours, and glyco proteins.

The amylaceous material manufactured by the present invention has alkaline viscosities which are in the range of 10 to 20 seconds using a 1.3 g sample and 15 to 100 seconds using a 5.2 g sample and having cold water solubles of between 50% and 98%.

With the present invention the method of manufacturing the improved amylaceous material includes the following steps: acid hydrolysis at moistures between 5% and 12%, as is basis, using between 0.1% and 2% acid anhydrous basis; neutralization of the acid hydrolyzed amylaceous material to between pH 3 and 6 obtained on a 10% solids water slurry; gelatinization of the neutralized acid hydrolyzed amylaceous material at moisture levels between 15% and 40% and at temperatures of between 212° and 400° F; removal of water from the gelatinized product by allowing residual heat to flash off water and by subjecting it to the action of a drying medium such as air or heat; and/or commuting the amylaceous mass to pellets or flakes; and comminuting the dried amylaceous mass to a flour.

In manufacturing a resinlike material, with the present invention the method may include mixing a filler material and a heat-accelerated curable binder system, wherein the binder system is produced by cross-linking a saccharide-containing substance with glyoxal in water; and controlling the reaction rate by the use of an alkali halide selected from the group comprising KCl, KBr, NaCl, and NaBr; the method also including the followng steps: dissolving or dispersing the salt, saccharide-containing substance and glyoxal in water; dispersing from 0%–80% of fillers, extenders and/or pigments in the above mixture; shaping, forming or using the mixture as a coating; causing the mixture to react by the application of heat; and removing moisture from the reacted mixture.

In the preceding examples, the analytical values for alkaline viscosity were determined by the method already described. The procedure for the cold water solubles (CWS) was:

A 20 gm sample was weighed and added to 480 g distilled water in a 600 ml beaker. A magnetic stirrer was used to disperse the material with stirring carried out for 5 minutes. (If the sample tended to lump when added to the water, addition was made by sifting the sample into the water with stirrer running using a tea strainer.) The slurry was allowed to stand one hour and then mixed again for 2 minutes. The slurry was filtered using 18.5 cm fluted paper (Reeve Angel #802 or equivalent). The first few cc's of filtrate were discarded. 10 ml of the filtrate were placed in a weighed aluminum weighing dish and the dish and aliquot weighed. The aliquot was dried at 70° C in a circulating air oven for 24 ± 2 hours. The dried residue was weighed and % solubles calculated.

The preferred curable system of the present invention may further be defined in terms of molecular weight or mole ratios wherein the saccharide material may be considered as monomeric anhydroglucose of molecular weight 162.1, the polyaldehyde as glyoxal monomer of molecular weight 58 and the alkali halide as sodium chloride of molecular weight 58.4. In these terms, the curable system may be described as containing a mole ratio of polyol to polyaldehyde of 1:1 to 10:1 and a mole ratio of polyol to alkali halide of 2:1 to 1:10. An alternate method of determining mole ratios is to use the actual polyol polymer molecular weight. In this case the mole ratio of polyol to polyaldehyde is from 1:1 to 1:3 and the mole ratio of polyol to alkali halide is from 1:0.3 to 1:10. These molar ratios are the preferred ranges of the curable system but should not be construed as limiting the scope of the present invention.

What we claim is:

1. The method of manufacturing a bonded particulate article comprising the steps of admixing particulate material with a binder system, the binder system being formed by admixing a polyol selected from the group comprising a saccharide, a saccharide polymer, and a glyco protein with glyoxal, with a solvent, and with an alkali halide; forming the admixture in a heated mold; removing the bonded article from the mold; and allowing it to cool.

2. The method claimed in claim 1 wherein the solvent is water.

3. The method claimed in claim 2 wherein the particulate material is sand.

4. The method claimed in claim 2 wherein the particulate material is cellulosic.

5. A bonded particulate article manufactured by the method of claim 1 and comprising 80%–99% particulate material and 1%–20% binder system with the latter being comprised of 60%–84% saccharide material, 3%–27% glyoxal, and 8%–32% alkali halide.

6. A bonded particulate article as claimed in claim 5 wherein the particulate material is sand and the bonded article is a foundry core.

7. The bonded particulate article as claimed in claim 5 wherein the particulate material is cellulosic.

8. The bonded particulate article as claimed in claim 7 wherein the cellulosic particulate material is a refined wood from the group consisting of sawdust, wood chips, wood particles, and wood fiber.

9. The method of manufacturing a bonded particulate article comprising the steps of admixing a particulate material with a binder system wherein the latter is formed by the steps of admixing a saccharide-containing material with glyoxal, a solvent and an alkali halide; forming the article in a mold; removing the article from the mold; and desolventizing the article.

10. The method claimed in claim 9 wherein the desolventizing is accomplished by the application of heat.

11. The method claimed in claim 10 wherein the article is coated with additional solvent prior to the application of heat.

12. The method claimed in claim 11 wherein the solvent which is applied prior to the application of heat contains a coating material to surface coat the article.

13. The method claimed in claim 9 wherein the solvent is water.

14. A bonded particulate article manufactured by the method of claim 9 comprising 80%–99% particulate material and 1%–20% binder system, with the latter being comprised of 60%–84% saccharide material, 3%–27% glyoxal, and 8%–32% alkali halide.

15. The article claimed in claim 14 wherein the particulate material is sand and the article is a foundry core.

* * * * *